Oct. 18, 1966  D. L. ADAMS  3,280,317
ROOT LOCUS PLOTTER
Filed Sept. 14, 1962  2 Sheets-Sheet 1
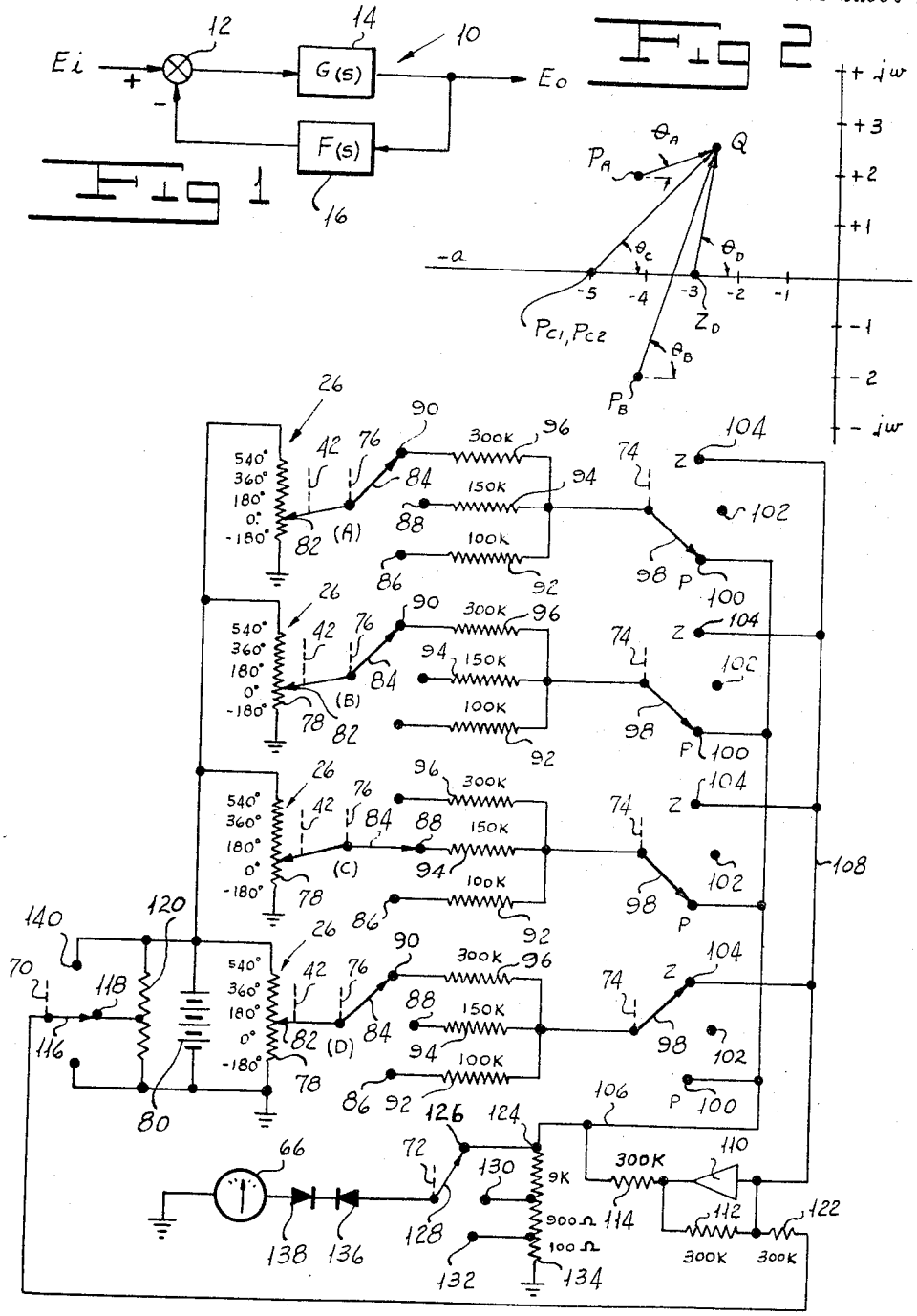
INVENTOR.
DON LUIS ADAMS
BY
Shenier & O'Connor
ATTORNEYS

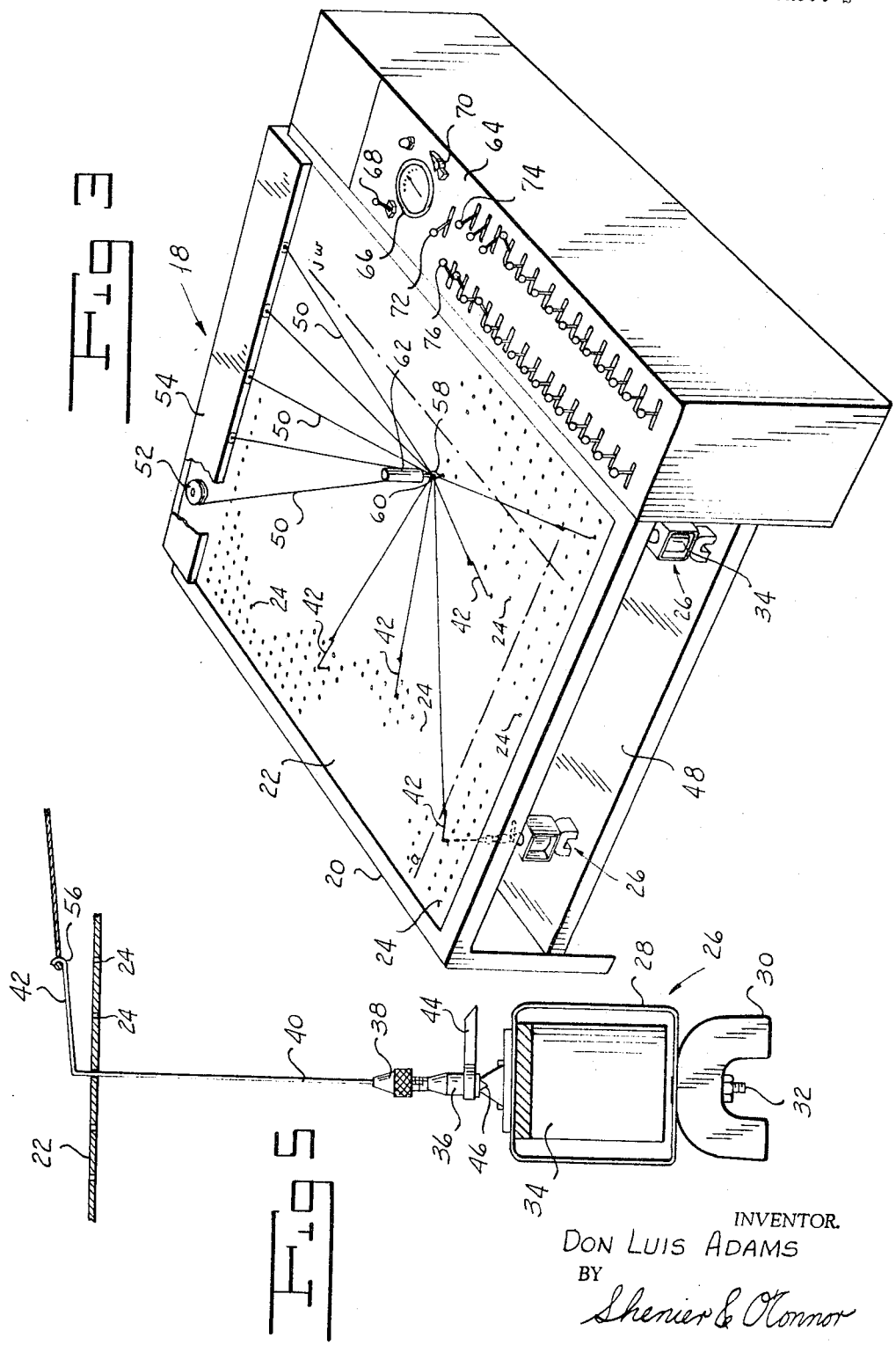

ID

3,280,317
ROOT LOCUS PLOTTER
Don Luis Adams, Fairfield, Conn., assignor to United Aircraft Corporation, East Hartford, Conn., a corporation of Delaware
Filed Sept. 14, 1962, Ser. No. 223,768
15 Claims. (Cl. 235—179)

My invention relates to a root locus plotter and, more particularly, to a plotting device for summing a plurality of vector angles to facilitate the design of a servo mechanism.

In the prior art, in designing a servo mechanism, the designer must be sure that his system is stable. That is, it must maintain a definite and known relationship between the controlled variable or output and the desired value or reference input. Any transient response to a disturbance should disappear within a reasonable length of time after cessation of the disturbance causing the transient.

It has been discovered that the qualitative physical approach alone is unsatisfactory for the design of a servo mechanism. A quantitative method which is either mathematical or graphical is much to be preferred. One method which has been employed in the prior art for determining system stability provides a graphical procedure which leads to a clear indication of the effect of gain adjustment or compensation upon the performance of the system. In practicing this method in the prior art, the open loop transfer function of the system is obtained and arranged in factored form. When this has been done, the singularities of the transfer function are determined by examination and these poles and zeros are plotted on the complex plane. By graphical computation, combined with examination, the loci on which the roots of the closed loop system must fall are determined. The previously plotted poles and zeros determine these loci. Once this root locus has been plotted, the exact positions of the roots are graphically located by considering the gain of the open loop transfer function and these roots are used to write the equation for system performance.

While the root locus technique described above is a satisfactory method for analyzing system performance and for solving design problems, it is extremely time consuming in that it requires a large number of arithmetical calculations and graphical operations.

I have invented a root locus plotter which overcomes the disadvantages inherent in the root locus technique of the prior art. My plotter permits determination of the root locus in a rapid and expeditious manner. Thus my plotter greatly facilitates the problems of analyzing a system and of designing a new system. My apparatus is relatively simple in its construction and operation for the result achieved thereby.

One object of my invention is to provide a root locus plotter which overcomes the disadvantages of the root locus technique of the prior art.

Another object of my invention is to provide a root locus plotter which permits determination of the root locus in a rapid and expeditious manner.

A further object of my invention is to provide a root locus plotter which greatly facilitates the design or analysis of a servo mechanism.

Still another object of my invention is to provide a root locus plotter which is simple in its construction and operation for the result achieved thereby.

Other and further objects of my invention will appear from the following description.

In general, my invention contemplates the provision of a root locus plotter in which a plurality of signal-producing devices having arms adapted to be orientated to represent vectors are supported with respect to a board representing the complex plane. I position the sensing devices at points corresponding to poles and zeros of the transfer function of the system under consideration and connect the other end of each of the arms to a common probe adapted to be moved to any position in the complex plane to change the orientation of the vectors represented by the arms to vary the output signals of the signal-producting devices. I algebraically add the output signals and apply the resultant signal to an indicating device, which indicates a null when the probe is positioned at a root. In this manner, I rapidly and expeditiously trace the root locus of the transfer function.

In the accompanying drawings which form part of the instant specification and which are to be read in conjunction therewith and in which like reference numerals are used to indicate like parts in the various views:

FIGURE 1 is a diagrammatic view of a typical servo mechanism under consideration.

FIGURE 2 is a plot of the poles and zeros of a particular function.

FIGURE 3 is a perspective view of one form of my root locus plotter.

FIGURE 4 is an elevation of one of the signal-producing devices of my root locus plotter.

FIGURE 5 is a schematic view of one form of the electrical circuit of my root locus plotter.

Referring now to FIGURE 1 of the drawings, I have shown a simplified closed loop system indicated generally by the reference character 10 in which a summer 12 applies an input signal $E_i$ to the forward path 14 of the system having a transfer function $G(s)$ where $s$ is the complex variable. The system 10 is adapted to produce an output signal $E_o$ which is fed back to the summer 12 by a feedback path 16 having a transfer function $F(s)$. As is known in the art, the complex ratio of the output voltage $E_o$ to the input voltage $E_i$ is equal to the forward transfer function $G(s)$ over 1 plus the product of the forward transfer function $G(s)$ and the feedback transfer function $F(s)$, or (1)  $(E_o/E_i)(s) = (G(s))/(1+G(s)F(s))$ For unstable conditions of operation of the system 10, the term on the left Equation 10 approaches infinity and for this condition to result, the denominator of the right-hand term in Equation 1 is zero. For this latter condition to exist, the term $G(s)F(s)$ must be equal to minus 1. Therefore, the root locus is determined by the expression (2)  $G(s)F(s) = X \angle \pm 180°$ where X has any value.

The root locus technique can best be understood by considering a particular example. For example, let us assume (3)  $G(s)F(s) = K(s+3)/((s+4-j2)(s+4+j2)(s+5)^2)$ From this expression, the singularities can readily be determined. It will be seen that Equation 3 has a pole at $s=-4+j2$, a pole at $s=-4-j2$, a pole of the second order at $s=-5$ and a zero at $s=-3$.

Referring to FIGURE 2, I have plotted all the poles and zeroes, $P_A$, $P_B$, $P_C$ and $Z_D$, for the particular example being considered and have shown a point Q as an arbitrary point under examination. The factored terms to the right in Equation 3 are represented by vectors leading from the poles and zeros to the point Q under examination. As will be apparent from the figure, the vectors shown in FIGURE 2 have respective angles $\theta_A$ to $\theta_D$. It will be apparent from the description given hereinabove that where the sum of the pole angles less the sum of the zero angles is 180°, then the point Q is a point on the root locus. That is, if $\theta_A + \theta_B + 2\theta_C - \theta_D = 180°$, then the point Q is a point on the root locus. In the prior art, this determination of the algebraic sum of the vectors is performed graphically in a large number of trial and error steps.

Referring now to FIGURE 3, my root locus plotter, indicated generally by the reference character 18, includes a frame 20 carrying a plotting board 22, which may be a metal sheet, provided with a plurality of perforations 24 over its surface. As will be apparent from the description of my plotter given hereinafter, the sheet 22 represents the complex plane while the perforations 24 represent points on the complex plane. Each of the signal-producing devices, indicated generally by the reference character 26, includes a frame 28 secured to a horseshoe magnet 30 by any suitable means, such as a bolt 32. Each frame 28 supports a device such as a two-turn potentiometer 34, the shaft 36 of which carries a chuck 38 which removably secures a wire 40 formed with an arm 42 to the shaft 36. Shaft 36 carries a pointer 44 for movement therewith to permit the arm 42 to be correctly aligned when it is inserted in the chuck 38 in a manner to be described. The frame 28 carries a pointer 46 which permits the sensing device 26 to be properly aligned when placed in position on the plotter 18 in a manner to be described.

A platform 48 supported on the frame 20 below the board 22 is adapted to support the sensing devices 26. I form the platform 48 from a material such as steel or the like so that when the magnet 30 is placed on the platform to position the device 26, it will be held in this position.

I provide my plotter 18 with a plurality of constant tension strings or cables 50, which extend between reels 52 within a housing 54 on the frame and respective hooks 56 on the ends of the arms 42. In passing from the reels 52 to the hooks 56, the cables pass through an eye 58 formed in a probe 60 having a handle 62.

The control panel 64 of my plotter includes a meter 66 which indicates a null when a point on the root locus has been determined. An on/off switch 68 is actuated to apply power to the unit. A switch 70 permits the null of the meter 66 to be adjusted. I control the sensitivity range of meter 66 by a switch 72. A first group of three-position switches 74 corresponding in number to the number of signal-producing sensing devices 26 are actuated in accordance with the fact of whether the corresponding sensing device is located at a pole or at a zero. Switches 74 may also be actuated to disable a sensing device where its position does not correspond to a singular point of the transfer function. A second plurality of switches 76 are adapted to be moved to positions corresponding to the order of the respective poles or zeros to which the sensing device corresponds.

Referring now to FIGURE 4, I have shown one form of electrical circuit which can be employed with my plotter. For purposes of simplicity, I have shown the circuitry associated with only four of the sensing devices 26. I connect the two-turn windings 78 of the devices 76 in parallel across a suitable source of potential such, for example, as a battery 80. The brushes 82 associated with the respective windings apply the potentiometer voltages to the arms 84 of the switches 76. Each arm 84 is adapted to be moved selectively into engagement with one of a plurality of contacts 86, 88 and 90 in accordance with the order of the pole or zero to which the associated unit 26 corresponds. I connect a group of resistors 92, 94 and 96 respectively between the terminals 86, 88 and 90 of a group and the switch arm 98 of a switch 74. It will be apparent from the weights assigned to the resistors 92, 94 and 96 that they correspond respectively to a third order, a second order and a first order term. That is, with an arm 84 in engagement with contact 88, twice as much current flow is permitted as that which flows when the arm 84 is in engagement with the contact 90. It will be understood further that while I have shown a system in which only first, second and third order terms are accounted for, I can provide higher order terms as necessary.

Each switch arm 98 is adapted to be moved selectively into engagement with the contacts 100, 102 and 104 of an associated group, depending upon whether the singularity under consideration is a pole, is for some reason not being considered, or is a zero. I connect all the contacts 100 corresponding to poles to a common conductor 106 on which the signals are summed. Similarly, I connect all the contacts 104 corresponding to zeros to a common conductor 108 which sums the signals at these terminals and applies them to a high gain, stabilized, direct current, feedback, inverting amplifier 110 having a feedback resistor 112 and an output resistor 114 which applies the inverted output to the conductor 106. I normally connect the switch arm 116 of the switch 70 to a contact 118 connected to a center tap of a resistor 120 across the battery 80 to apply the proper reference potential to the amplifier 110 through a resistor 122 so that no signal will be applied to the meter 66 at a point corresponding to a root.

From the structure thus far described, it will be apparent that the vector angles of all vectors from the poles are summed on conductors 106, while the vector angles of all vectors from zeros are summed on conductor 108. The sum on conductor 108 plus the reference signal is inverted and subtracted from the sum on conductor 106 so that at a point 124, there appears a signal which represents the difference between the sum of the pole vector angles and the sum of the zero vector angles plus 180°. Point 124 is connected to one terminal 126 of the sensitivity switch 72, the arm 128 of which normally engages contact 126. Switch 72 includes other contacts 130 and 132 connected to suitable taps on a voltage-dividing resistor 134 so arranged as to provide the desired scale factors. It will be appreciated that when the scale factor has to be changed, arm 128 is moved to the appropriate contact 130 or 132. Respective current-limiting diodes 136 and 138 connected back-to-back, apply the signal on arm 128 to the meter 66. I provide switch 70 with a contact 140 adapted to be engaged by arm 116 when the reference voltage applied to the amplifier 110 must be changed to permit meter 66 to give a null in repsonse to the signals.

It will readily be appreciated that I may, if desired, provide resistor 120 with additional taps and change the value of resistor 122 to permit a large swing of the reference voltage. In examining any point with switch 72 on low sensitivity, the arm 116 could be moved to the various tap terminals until the operator observed that he was near a null. Then the switch 72 could be moved to the higher sensitivity positons to determine the null precisely.

The operation of my root locus plotter is best understood by considering a specific example such as the one outlined above, in which the transfer function has a pole $P_A$ at $s=-4+j2$, a pole $P_B$ at $s=-4-j2$, two poles $P_{C1}$ and $P_{C2}$ at $s=-5$ and a zero $Z_D$ at $s=-3$. With these singularities known, I place a unit 26 at each location on the plotting board 22 corresponding to these points. Suitable reference coordinate axes can be provided on the board 22 itself, as indicated by the dot dash lines in FIGURE 3. I remove each of the wires 40 from its corresponding chuck 38 and insert the wires through perforations in the board at points corresponding to the singularities. Next, the wires are reinserted in the chucks 38 so that the arms 42 are on top of the plotting board. In performing these operations, I use the pointers 46 to ensure that the units 26 are properly located on the platform 48 and I refer to the pointers 44 to ensure that the arms 42 are correctly orientated.

When these operations have been accomplished, I take a number of cables 50 corresponding to the number of singularities and connect them to the hooks 56 of the units 26 positioned at the singularities. It will be remembered that each of the constant tension cables 50 passes through the eye 58 of the probe 60. The switches 76 are then operated to provide the proper weight to the outputs of their associated potentiometers. Similarly, switches 74 are operated in accordance with whether their associated units 26 represent poles or zeros.

In the particular example being considered, let us assume that the units 26 from top to bottom in FIGURE 4 correspond respectively to $P_A$, $P_B$, $P_C$ and $Z_D$. Under these conditions, arm 84 of the uppermost unit in the figure engages contact 90 and the arm 98 of the uppermost unit engages the pole contact 100. In the next unit, the arms 84 and 90 are similarly positioned. The $P_C$ poles must be represented as a second order term and for this reason, the arm 84 of the next unit engages the contact 88 while the arm 98 engages the pole contact 100. Since the zero $Z_D$ is a first order term, arm 84 of the last unit engages the contact 90 while the arm 98 is moved into engagement with the zero contact 104.

My plotter is now set up for the determination of the root locus in the particular example under consideration. If a point Q is under examination, the arms 42 of the various units 26 will be positioned at angles $\theta_A$, $\theta_B$, $\theta_C$ and $\theta_D$ representing the angular rotation of the respective vectors from the singularities to the point Q. Thus, the respective brushes 82 of the units 26 in FIGURE 4 carry signals representing these angles. These signals are applied to the conductors 106 and 108 so that conductors 106 carry a representation of $\theta_A + \theta_B + 2\theta_C$ while conductors 108 carry a representation of $\theta_D$. After inversion of the signal on conductor 108 and the reference signal, the sum of the signals on conductor 106 and the sum of the signals on conductor 108 plus the reference signal are subtracted so that if $\theta_A + \theta_B + 2\theta_C - \theta_D$ is 180°, no signal appears at point 124 and meter 66 indicates a null. This null indicates to the operator that he has located a point on the root locus.

For purposes of simplicity in exposition, in FIGURE 4 I have shown the units corresponding to the poles $P_A$, $P_B$, $P_C$ and the zero $Z_D$ as picking off voltages corresponding to 0°, 0°, 0° and 180° so that $$\theta_A + \theta_B + 2\theta_C - \theta_D = 180°$$

Assume that the meter 66 is nulled and that the voltage on conductor 106 is zero. Now if battery 80 provides 60 volts, then the pole currents flowing in conductor 106 toward the meter will be 15/300K=50 ua, 15/300K=50 ua, and 15/150K=100 ua; and the total current will be 200 ua. With switch 70 in the midpoint position (30) volts) shown, the reference current flowing through resistor 122 toward the input of inverting amplifier 110 will be 30/300K=100 ua. The zero currents flowing in conductor 108 toward the input of inverting amplifier 110 will be only 30/300K=100 ua. The total input current of the inverting amplifier will be 200 ua. Since amplifier 110 has a high gain, its input is virtually at ground potential and substantially all of this input current must flow through feedback resistor 112. Thus the output of amplifier 110 will be negative and substantially equal to —60 volts. Hence the current flowing away from the meter through resistor 114 will be 200 ua. Therefore the net meter current is zero; and the voltage on conductor 106 must be zero as was originally assumed. It will be noted that if $\theta_A$ or $\theta_B$ is equal to 360° or if $\theta_D$ is equal to —180°, then the equation for the root locus is still satisfied; however, to achieve a null of meter 66, it would be necessary to switch armature 116 into engagement with contact 140. It will further be noted that if $\theta_D$ is equal to 540°, then the root locus equation is satisfied; however, armature 116 must be moved into engagement with the grounded contact of switch 70 in order to null the meter. As is pointed out hereinabove, if desired, resistor 120 could be provided with more taps and the value of resistor 122 could be changed to permit a large swing of the reference voltage. For example, I may provide further taps on resistor 120 corresponding to the one-quarter and the three-quarters points; and the value of resistor 122 may be correspondingly halved to 150 kilohms. In such event switch 70 should be positioned at the one-quarter point (15 volts) to null meter 66 for the example given.

The procedure described above is repeated at a number of points to determine those points at which the meter nulls and the resultant curve is the desired root locus. It will readily be understood that a record can be made in any suitable manner as by drawing directly on the plotting board or by placing a suitable recording medium, such as graph paper, over the board and tracing the path on this paper.

It will be seen that I have accomplished the objects of my invention. I have provided a root locus plotter which overcomes the defects of the root locus technique of the prior art. My plotter greatly facilitates the design or analysis of a servomechanism. My plotter permits the determination of the root locus in a rapid and expeditious manner. My apparatus is extremely simple in its construction and operation for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for determining the loci of possible roots of the closed loop frequency response function of a servo system from the pole singularities and zero singularities of the open loop transfer function of the system including in combination a plurality of signal producing devices each having an orientable element, means for positioning said devices at locations corresponding to said singularities, means for orienting said elements toward a point under examination to cause said devices to produce output signals and means for algebraically summing said output signals in accordance as said devices are positioned at pole singularities and zero singularities to produce a signal indicating that said point is the locus of a possible root.

2. Apparatus for determining the loci in the complex plane of possible roots of the closed loop frequency response function of a servo system from the pole singularities and zero singularities of the open loop transfer function of the system including in combination a plotting board representing the complex plane, a plurality of sensing devices having orientable elements, each sensing device being adapted to produce an output signal representing the position of its element, means mounting said sensing devices adjacent said board at locations corresponding to the positions of said singularities on said board, means for orienting said elements toward a point under examination to cause said devices to produce output signals and means for algebraically summing said output signals in accordance as said elements are positioned at pole singularities and zero singularities to produce a signal indicating that said point is the locus of a possible root.

3. Apparatus for determining the loci in the complex plane of possible roots of the closed loop frequency response function of a servo system from the pole singularities and zero singularities of the open loop transfer function of the system including in combination a plotting board representing the complex plane, a plurality of sensing devices each having an arm adapted to be moved to cause the devices to produce an output signal representing the position of the arm, means mounting said sensing devices adjacent said board at locations corresponding to the positions of said singularities on said board, a probe, means comprising a plurality of cables extending between said probe and said arms for orienting said arms toward a point under examination to cause said devices to produce output signals and means for algebraically summing said output signals in accordance as said elements are positioned at pole singularities and zero singularities to produce a signal indicating that said point is the locus of a possible root.

4. Apparatus for determining the loci in the complex plane of possible roots of the closed loop frequency response function of a servo system from the pole singularities and zero singularities of the open loop transfer function of the system including in combination a plotting board representing the complex plane, a plurality of sensing devices each having an arm adapted to be moved to cause the devices to produce an output signal representing the position of the arm, means mounting said sensing devices adjacent said board with locations corresponding to the positions of said singularities on said board, a probe, means comprising a plurality of cables, means on said probe for engaging said cables, means connecting said cables to said arms to orient said arms toward a point under examination to cause said devices to produce output signals and means for algebraically summing said output signals in accordance as said arms are positioned at pole singularities and zero singularities to produce a signal indicating that said point is the locus of a possible root.

5. Apparatus for determining the loci in the complex plane of possible roots of the closed loop frequency response function of a servo system from the pole singularities and zero singularities of the open loop transfer function of the system including in combination a sheet having perforations representing points in the complex plane, a plurality of sensing devices adapted to be actuated to produce output signals, means mounting said sensing devices adjacent respective perforations representing points in said complex plane at which singularities exist, said devices including shafts extending through said respective perforations, each of said shafts having an arm, the means for orienting said arms toward a point in the complex plane under examination to cause said devices to produce output signals representing the positions of said arms and means for algebraically summing said output signals in accordance as said elements are positioned at pole singularities and zero singularities to produce a signal indicating that said point is the locus of a possible root.

6. Apparatus for determining the loci in the complex plane of possible roots of the closed loop frequency response function of a servo system from the pole singularities and zero singularities of the open loop transfer function of the system including in combination a plotting board representing the complex plane, a plurality of sensing devices each having an arm adapted to be moved to cause the devices to produce an output signal representing the position of the arm, means comprising a support of magnetic material and respective permanent magnets carried by said devices for mounting said devices adjacent said board with said devices positioned at locations corresponding to the positions of said singularities on said board, a probe, means comprising a plurality of cables, means on said probe for engaging said cables, means connecting said cables to said arms to orient said arms toward a point under examination to cause said devices to produce output signals and means for algebraically summing said output signals in accordance as said arms are positioned at pole singularities and zero singularities to produce a signal indicating that said point is the locus of a possible root.

7. Apparatus for determining the loci in the complex plane of possible roots of the closed loop frequency response function of a servo system from the pole singularities and zero singularities of the open loop transfer function of the system including in combination a sheet having perforations representing points in the complex plane, a plurality of sensing devices adapted to be actuated to produce output signals, means extending through respective perforations representing points in said complex plane at which singularities exist, each of said means having an arm, means mounting said sensing devices adjacent the perforations through which said first-named means pass, means connecting said first-named means to said sensing devices, a probe, a plurality of constant tension cables extending from said probe to said arms to orient said arms toward a point in the complex plane under examination to cause said devices to produce output signals representing the positions of said arms and means for algebraically summing said output signals in accordance as said elements are positioned at pole singularities and zero singularities to produce a signal indicating that said point is the locus of a possible root.

8. Apparatus for determining the loci in the complex plane of possible roots of the closed loop frequency response function of a servo system from the pole singularities and zero singularities of the open loop transfer function of the system including in combination a plotting board representing the complex plane, a plurality of sensing devices each having an arm adapted to be moved to cause the devices to produce an output signal representing the position of the arm, means mounting said sensing devices adjacent said board with said devices positioned at locations corresponding to the positions of said singularities on said board, a probe, means comprising a plurality of cables, means on said probe for engaging said cables, means connecting said arms to orient said arms toward a point under examination to cause said devices to produce output signals, means for weighting said output signals in accordance as said pole singularities and zero singularities represent higher order terms and means for algebraically summing said output signals in accordance as said arms are positioned at pole singularities and zero singularities to produce a signal indicating that said point is a locus of a possible root.

9. Apparatus for summing a plurality of vector angles including in combination a plotting board comprising a sheet provided with perforations, respective rotatable shafts extending through perforations in said sheet at points corresponding to the origin of said vectors, each of said shafts having an arm, means positioning said arms in accordance with the angles of said vectors, means responsive to the rotary displacements of said shafts for producing respective output signals proportional to the angular positions of said arms and means for algebraically summing said signals to produce a signal indicating the sum of said vectors.

10. Apparatus for determining the loci in the complex plane of possible roots of the closed loop frequency response of a servo system from the pole singularities and the zero singularities of the open loop transfer function of the system including in combination means forming a planar surface having holes therein, said surface corresponding to said plane, a plurality of selectively positionable sensing means, means for supporting said sensing means below said surface at spaced locations corresponding to singularities, each of said sensing means comprising an orientable element extending through one of said perforations to a location above said surface and means responsive to the orientation of the corresponding element for providing a signal indicating the orientation thereof, a probe for selective insertion in one of said holes, a plurality of cables extending between said probe and the respective orientable elements for orienting the same and means for algebraically summing said signals.

11. Apparatus as in claim 10 including self-winding reels for said cables and means mounting said reels adjacent said surface providing means.

12. Apparatus as in claim 10 including self-winding reels for said cables and means mounting said reels adjacent said surface providing means and in which said probe comprises an eye and in which said elements comprise hooks, said cables extending from said reels through said eye and into engagement with said hooks.

13. Apparatus as in claim 10 in which said supporting means comprises a shelf formed of magnetic material and including magnets for positioning said sensing means on said shelf.

14. Apparatus as in claim 10 including a detachable connection between said signal providing means and said orientable elements.

15. Apparatus as in claim 10 in which said sensing comprise potentiometers having housed arms and having external pointers for indicating the orientation of said arms.

References Cited by the Examiner

UNITED STATES PATENTS

| | | | |
|---|---|---|---|
| 2,989,238 | 6/1961 | Ford | 235—193 X |
| 3,054,561 | 9/1962 | Hazeltine | 235—184 |

OTHER REFERENCES

Baker, Automatic Electron Trajectory Plotting Using Electrolytic Tank Analogue, British Journal of Applied Physics, vol. 5, May 1954 (pp. 191–195 relied on). (Copy Group 240, 235–104.)

MALCOLM A. MORRISON, *Primary Examiner.*

A. J. SARLI, *Assistant Examiner.*